(12) United States Patent
Wong et al.

(10) Patent No.: US 9,226,200 B2
(45) Date of Patent: Dec. 29, 2015

(54) NETWORK ASSISTED INTERFERENCE CANCELLATION

(71) Applicants: Shin Horng Wong, Swindon (GB); Matthew P. J. Baker, Swindon (GB); Teck Hu, Melbourne, FL (US)

(72) Inventors: Shin Horng Wong, Swindon (GB); Matthew P. J. Baker, Swindon (GB); Teck Hu, Melbourne, FL (US)

(73) Assignee: Alcatel Lucent, Boulogne-Billancourt (FR)

(*) Notice: Subject to any disclaimer, the term of this patent is extended or adjusted under 35 U.S.C. 154(b) by 252 days.

(21) Appl. No.: 13/892,017

(22) Filed: May 10, 2013

(65) Prior Publication Data

US 2014/0334440 A1 Nov. 13, 2014

(51) Int. Cl.
  *H04W 4/00* (2009.01)
  *H04W 36/00* (2009.01)
  *H04W 24/02* (2009.01)
  *H04J 11/00* (2006.01)
  *H04W 16/06* (2009.01)
  *H04W 48/10* (2009.01)

(52) U.S. Cl.
  CPC ......... *H04W 36/0011* (2013.01); *H04J 11/005* (2013.01); *H04J 11/0056* (2013.01); *H04W 16/06* (2013.01); *H04W 24/02* (2013.01); *H04W 48/10* (2013.01); *H04B 2201/70702* (2013.01)

(58) Field of Classification Search
  USPC .......... 370/252–280, 328–335; 455/452–522
  See application file for complete search history.

(56) References Cited

U.S. PATENT DOCUMENTS

| | | | |
|---|---|---|---|
| 7,636,334 B2* | 12/2009 | Gerlach | 370/330 |
| 7,890,130 B2* | 2/2011 | Sung et al. | 455/522 |
| 8,203,998 B2* | 6/2012 | Kandukuri Narayan | 370/328 |
| 8,346,173 B2* | 1/2013 | Chen et al. | 455/63.1 |
| 8,433,350 B2* | 4/2013 | Sung et al. | 455/501 |
| 8,737,187 B2* | 5/2014 | Yoo et al. | 370/201 |
| 8,837,269 B2* | 9/2014 | Ancora et al. | 370/203 |
| 2009/0196162 A1* | 8/2009 | Sambhwani et al. | 370/201 |
| 2011/0267937 A1 | 11/2011 | Yoo et al. | |
| 2012/0093093 A1* | 4/2012 | Frenger et al. | 370/329 |
| 2013/0196701 A1* | 8/2013 | Tiirola et al. | 455/501 |

FOREIGN PATENT DOCUMENTS

EP 2280492 A1 2/2011

OTHER PUBLICATIONS

3rd Generation Partnership Project 36829-b10, Enhanced Performance Requirement for LTE User Equipment, Technical Specification Group Radio Access Network, 2012, pp. 1-114, Release 11, 3GPP Organizational Partners.
3rd Generation Partnership Project TSG RAN WG1 Meeting #72bis, "Network Assistance for Interference Cancellation in Cell Range Expansion for Heterogeneous Networks," Ericsson, ST-Ericsson, pp. 1-8, Chicago, Apr. 15-19, 2013.
Ritt et al., "Signalling for Downlink Inter-cell Interference Cancellation", 3GPP TSG-RAN WG1 #44-bis Meeting, Mar. 27, 2006, 3 pages.
International Search Report and Written Opinion correlating to PCT/US2014/035680 dated Jul. 24, 2014, 12 pages.

* cited by examiner

*Primary Examiner* — Man Phan
(74) *Attorney, Agent, or Firm* — Davidson Sheehan LLP

(57) ABSTRACT

The present application describes embodiments of methods for network assisted interference cancellation. Some embodiments of the method include broadcasting control information from a first cell over a common control channel. The control information is associated with a data channel transmitted by the first cell and the control information is usable by user equipment served by a second cell to mitigate interference caused by the data channel at the user equipment.

19 Claims, 5 Drawing Sheets

NETWORK ASSISTED INTERFERENCE CANCELLATION

BACKGROUND

1. Field of the Disclosure

The present disclosure relates generally to wireless communication systems and, in particular, to network assisted interference cancellation in wireless communication systems.

2. Description of the Related Art

Heterogeneous wireless communication systems typically include a variety of different types of cells deployed in an overlay configuration. For example, a heterogeneous wireless communication system may include macrocells for providing wireless connectivity over relatively large areas and one or more smaller cells for providing wireless connectivity over relatively small areas within the larger areas covered by the macrocells. The macrocells may include base station, base station routers, and the like. The smaller cells may include low power nodes, microcells, femtocells, picocells, access points, home base station routers, and the like. The terms “cell,” “macrocell,” “microcell,” etc. are conventionally used to indicate both the physical device used to provide wireless connectivity and the coverage area of the wireless connectivity. Thus, the term “macrocell” may refer to a base station that provides wireless connectivity for the coverage area of the base station. User equipment can communicate with the wireless communication system over downlink (or forward link) channels that convey information from the network to the user equipment or uplink (or reverse link) channels that convey information from the user equipment to the network.

User equipment can be offloaded from the macrocells to the smaller cells to improve the overall capacity of the heterogeneous wireless communication system. For example, user equipment may hand off from the macrocell to a smaller cell when the signal-to-interference-plus-noise ratios (SINR) of signals received at the user equipment from the macrocell are smaller than the SINR of signals received at the user equipment from the smaller cell. Biasing can be applied to force user equipment to hand over to the smaller cells at lower SINRs than in typical handovers between macrocells. Biasing expands the coverage area of the smaller cells and can cause more user equipment to be offloaded from the macrocells to the smaller cells. Thus, biasing may further increase the capacity of the heterogeneous wireless communities in system. However, user equipment that hands off from a macrocell to a smaller cell may receive strong interfering signals from the macrocell, particularly when the user equipment is in the expanded range of the smaller cell.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 1 is a block diagram of a wireless communication system, according to some embodiments.

FIG. 2 illustrates a wireless communication system that includes an interfering cell and an interbred cell that serves user equipment, according to some embodiments.

FIG. 3 is a flow diagram of a method for mitigating interference using control information broadcast by an interfering cell, according to some embodiments.

FIG. 4 is a flow diagram of a method for providing network assistance information for interference mitigation, according to some embodiments.

FIG. 5 is a flow diagram of a method for providing network assistance information for interference mitigation, according to some embodiments.

DETAILED DESCRIPTION

Network-assisted interference cancellation techniques have been proposed to allow user equipment to mitigate interference received by user equipment from an interfering cell when the user equipment is in an interfered cell. In the proposed technique, the interfered cell (which is also the serving cell for the user equipment) broadcasts a common control channel (such as a high-speed shared control channel, HS-SCCH) that carries information that allows the user equipment to decode dedicated control channels from one or more interfering cells. For example, the user equipment can decode the common control channel to obtain information about the dedicated control channels and then use this information to decode the dedicated control channels to obtain information about data channels transmitted by the interfering cell(s). The user equipment may then use this information to mitigate the interference by suppressing or canceling the interference from the data channels. However, this approach has a number of disadvantages. For example, latency is introduced by the time delay between decoding the common control channel broadcast by the interfered cell and decoding the dedicated control channels. For another example, the user equipment may need to decode a large number of control channels, which consumes processing resources at the user equipment. For yet another example, the interfering cell needs to inform the interfered cell about the (interfering) dedicated channel. This requires coordination and a very fast backhaul channel to can the information to the interfered cell. Another potential disadvantage related to timing is that the interfering and interfered cells may not be time aligned.

Many of these disadvantages can be reduced or overcome by allowing the interfering cell to broadcast control information over a common control channel instead of broadcasting the control information from the interfered, or serving, cell. The control information includes information associated with a data channel transmitted by the interfering cell. User equipment that are being served by the interfered cell can mitigate interference caused the interfering cell’s data channel using the information broadcast by the interfering cell. Some embodiments of the user equipment can mitigate the interference by suppressing the interference based on a modulation scheme or precoding matrix that is indicated in the common control channel and applied to the data channel. Alternatively, the user equipment can mitigate the interference by decoding one or more control channels dedicated to other user equipment served by the interfering cell and then decoding the data channel(s) that are transmitted to the other user equipment based on information carried by the dedicated control channels. The user equipment can then cancel the interference by subtracting the decoded data channel(s) from signals received over the air interface.

In some embodiments, the interfering cell can begin broadcasting the information over the common control channel in response to a request from the interfered cell that is serving the user equipment. Information needed by the user equipment to decode the common control channel broadcast by the interfering cell can be signaled to the user equipment by the interfering cell prior to hand over from the interfering cell to the interfered cell. Alternatively, the information needed by the user equipment to decode the common control channel broadcast by the interfering cell can be signaled to the user equipment by the interfered cell. For example, the interfered cell may provide an orthogonal variable spreading factor (OVSF) to the user equipment for decoding the common control channel broadcast by the interfering cell. In some embodiments, the interfered cell may also tell the interfering cell what kind of information to broadcast over the common control channel based on the capabilities of the user equipment.

Figure 1:
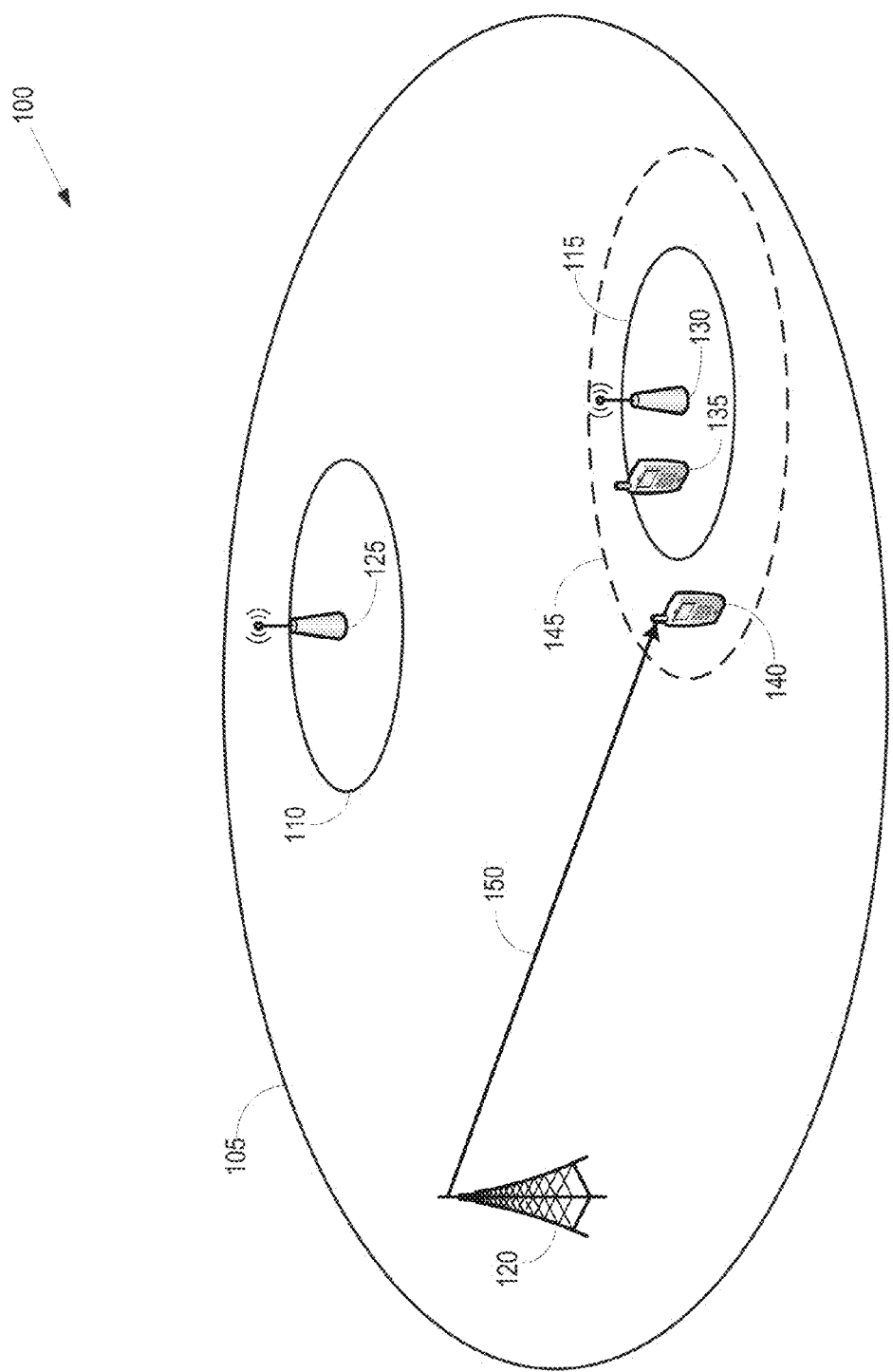

FIG. 1 illustrates a heterogeneous wireless communication system 100 that includes one or more macrocells 105 and one or more overlaying small cells 110 and 115, according to some embodiments. The macrocell 105 is served by a base station 120 or other device capable of providing wireless connectivity to the macrocell 105. However, in accordance with common usage in the art, the term "macrocell" may be used to refer to both the geographic area served by the base station 120 and the base station 120 itself. The same convention may be applied to the overlaying small cells 110 and 115, which may be served by one or more access points 125, 130 or other devices capable of providing wireless connectivity to the cells 110, 115. The cells 105, 110, 115 in the heterogeneous wireless communication system 100 may provide wireless connectivity according to wireless communication standards or protocols including the Universal Mobile Telecommunications Standards (UMTS), Long Term Evolution (LTE), high-speed downlink packet access (HSDPA), other standards defined by the Third Generation Partnership Project (3GPP, 3GPP2) or other standard-setting organizations.

User equipment 135 within the small cell 115 may be offloaded from the macrocell 105 to the small cell 115, e.g., to reduce loading on the macrocell 105 and improve the overall capacity of the wireless communication system 100. For example, the boundary between the macrocell 105 and the small cells 110, 115 may be determined by a ratio of the SINR of a pilot signal transmitted by the base station 120 and the SINR of a pilot signal transmitted by the access points 125, 130. User equipment 135 may then handoff to the cell 115 when the ratio falls below a threshold value.

Some embodiments of the wireless communication system 100 may also be able to apply handover bias to one or more user equipment or small cells so that user equipment preferentially hand off from the macrocell 105 to one or more of the smaller cells 110, 115. For example, a bias may be applied to user equipment 140 and small cell 115 so that user equipment 140 hands off to the small cell 115 at a lower value of the ratio of the SINR of the pilot signal transmitted by the base station 120 and the SINR the pilot signal transmitted by the small cell 115. The handover bias may therefore extend the range of the small cell 115 to the extended range 145.

Although the biasing is described herein in the context of a bias between a macrocell and a small cell, persons of ordinary skill in the art having benefit of the present disclosure should appreciate that embodiments of the wireless communication system may support biasing between any types of cells. In some embodiments of the wireless communication system 100 that operate according to UMTS, the bias can be applied by configuring a cell handover parameter Cell Individual Offset (CIO) such that user equipment favors handover to one cell over another cell. In some embodiments of the wireless communication system 100 that operate according to LTE, the bias can be applied by applying an offset to a trigger for reporting measurements of neighbor cells' signal strength relative to the current cell, in order to bias the relative levels at which a handover is triggered. These methods of biasing the handover typically lead to user equipment handing over to a cell at a tower SINR than in typical macro-macro handovers. Consequently, user equipment may face stronger interference from the source cell after a bias hand off from the source cell to a target cell, which may reduce the user equipment's throughput. For example, the user equipment 140 in the expanded region 145 may receive significant interference 150 from the macrocell 105 after handing off to the small cell 115.

User equipment 140 may therefore be configured to mitigate the interference 150 using control information transmitted from the macrocell 105. Some embodiments of the macrocell 105 may broadcast the control information over a common control channel in response to a request from the small cell 115 that is serving the user equipment 140. The user equipment 140 can decode the common control channel and then use the information in the decoded common control channel to suppress or cancel the interference 150. For example, the user equipment 140 may use the control information conveyed by the common control channel to decode one or more data channels transmitted by the macrocell 105. The decoded data channels can then be subtracted from the signals received by the user equipment 140 to cancel the interference 150. Some embodiments of the user equipment 140 may alternatively use the control information to suppress the interference 150 without decoding the data channels.

Some embodiments of the small cell 115 may be able to provide signaling that configures a subset of the user equipment to monitor control information broadcast by the macrocell 105. For example, user equipment 135 is within the small cell 115 and user equipment 140 is within the extended range 145. The access point 130 may therefore provide signals that can selectively configure user equipment 135, 140 to listen to a common HS-SCCH broadcast by the macro cell, e.g. by providing user equipment 135, 140 with the scrambling codes, OVSF codes and/or common radio network temporary identifier (RNTI) for the common HS-SCCH. The access point 130 may also set a monitoring threshold such that user equipment only monitors the common HS-SCCH if the reception geometry is negative. For example, user equipment 135 has a high SINR for signals received from the small cell 115, and therefore, is in a positive geometry and does not need to monitor for the common HS-SCCH. In contrast, user equipment 140 has a relatively lower SINR for signals received from the small cell 115, and therefore, is in a negative geometry and monitors the common HS-SCCH. Upon receiving the HS-SCCH, user equipment 140 obtains the information to cancel off a data channel, such as a high-speed physical downlink shared channel (HS-PDSCH) from the macrocell 105, to improve its SINR.

Figure 2:
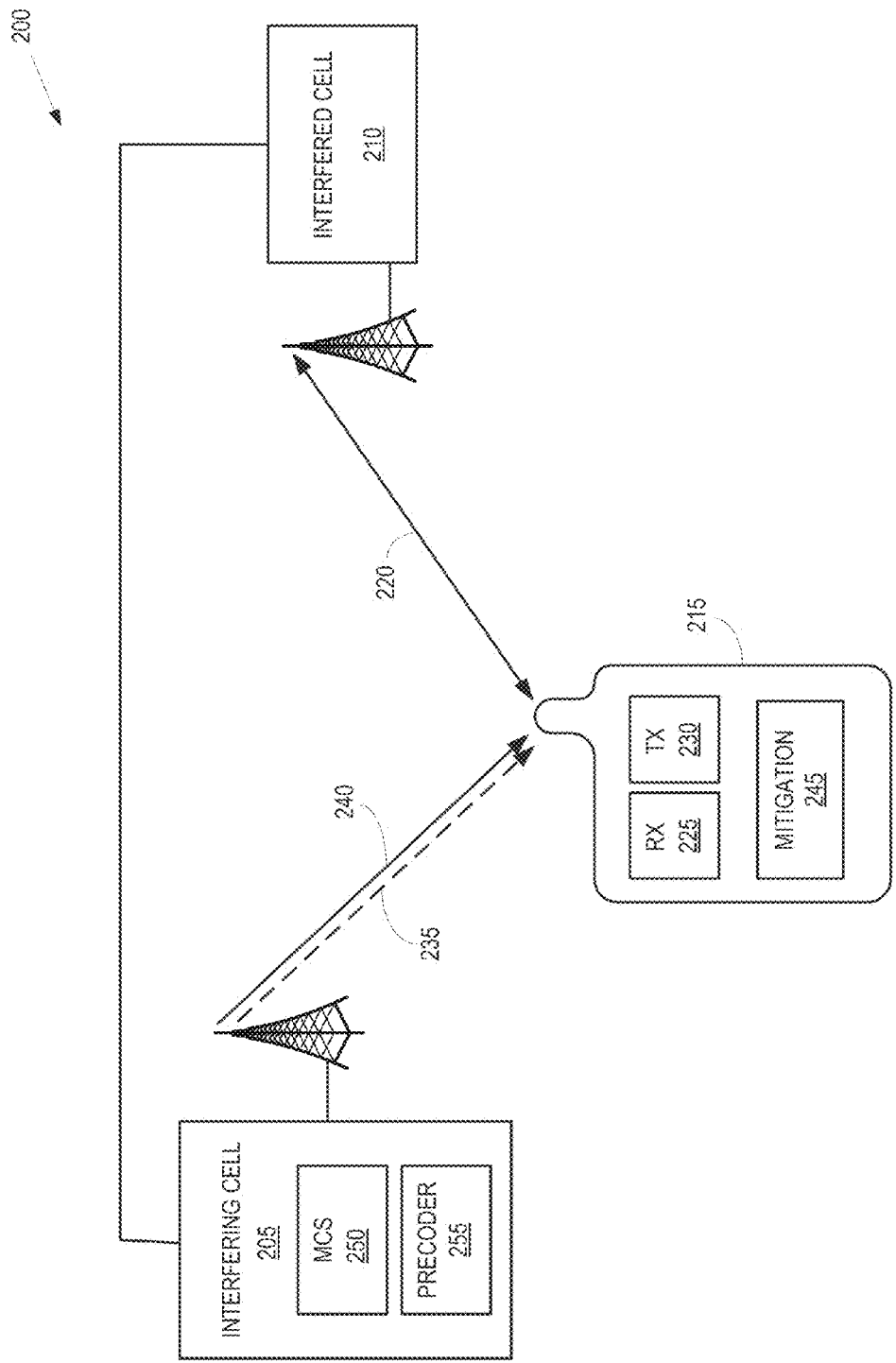

FIG. 2 illustrates a wireless communication system 200, including an interfering cell 205 and an interfered cell 210 that serves user equipment 215, according to some embodiments. The interfered cell 210 is serving the user equipment 215 and so the interfered cell 210 and the user equipment 215 communicate over uplink and downlink channels 220. The uplink or downlink channels 220 may include various control channels and data channels depending on the standards or protocols that govern operation of the channels 220. User equipment 215 includes receive logic (RX) 225 and transmit logic (TX) 230 that can be used to transmit and receive information over the uplink or downlink channels 220. Receive logic 225 can be used to demodulate and decode signals received over the downlink. Transmit logic 230 can be used to modulate and encode signals for transmission over the uplink.

User equipment 215 may also receive interference from one or more data channels 235 transmitted by the interfering cell 205. For example, user equipment 215 may have previously handed off from the interfering cell 205 to the interfered cell 210 and may still be in a cell extension region or border region of the interfered cell 210. Consequently, user equipment 215 may be receiving relatively strong interfering signals from the interfering cell 205 due to data channels 235 that are transmitted to other user equipment (not shown in FIG. 2) served by the interfering cell 205. The interfering cell 205 may therefore broadcast control information over a common control channel 240, and user equipment 215 may receive this information and use it to mitigate interference caused by the data channel(s) 235. For example, user equipment 215 may include mitigation logic 245 that can suppress or cancel interference from the data channel(s) 235 using the information conveyed over the common control channel 240.

Some embodiments of the user equipment 215 may decode the data channel(s) 235 transmitted by the interfering cell 205 using the complete set of control information that is provided to the other user equipment that are being served by the interfering cell 205. User equipment 215 may then reconstruct the interfering data and subtract it from signals received over the air interface in order to improve the SINR of its own data, e.g., data received from the interfered cell 210 over the channels 220. Some embodiments of the interfering cell 205 may transmit on the common control channel 235 information to assist the user equipment 215 in decoding dedicated control channels (not shown in FIG. 2) associated with the user equipment served by the interfering cell 205. For example, the common control channel 235 may convey information identifying user equipment served by the interfering cell 205 because the dedicated control channels are typically scrambled using these identities and therefore cannot be decoded without this information. In some embodiments the interfering cell 205 may select a subset of the dedicated control channels. For example, the interfering cell 205 may select the subset of the dedicated control channels using indicators of the strength of the interference at user equipment 215 such as a number of spreading codes used to transmit data to user equipment 215, a power level used to transmit data to user equipment 215, or an amount of time-frequency resource used to transmit data to user equipment 215. The data is indicated by the selected dedicated control channel.

Some embodiments of the interfering cell 205 may convey on the common control channel 235 other information to help the user equipment 215 locate the dedicated control channels. For example, in embodiments that operate according to HSDPA, the common control channel 235 may convey the identities of the spreading codes used to transmit each dedicated control channel, such as the identity of the SF128 spreading code used to transmit each dedicated HS-SCCH. For another example, in embodiments that operate according to LTE, the common control channel 235 may convey information indicating the time-frequency resources used to transmit each dedicated control channel, which may include at least the index of one or more common control elements (CCEs) or extended CCEs (ECCEs) used to transmit each dedicated (extended) physical downlink control channel ((E)PDCCH). In the case of EPDCCH, the common control channel 235 may also convey information indicating whether each dedicated EPDCCH is localized or distributed and possibly the locations of the physical resource blocks (PRBs) containing each ECCE. Transmitting this information using the common control channel 235 may allow the user equipment 215 to cancel the interfering EPDCCH and also may allow it to determine the demodulation details of the interfering PDSCH.

In embodiments that operate according to LTE, the common control channel 235 may convey demodulation information for a subset of the PRBs transmitted by the interfering cell 205. For example, the interfering cell 205 may estimate that the strongest interference at user equipment 215 is caused by the subset of PRBs and may limit the common control channel 235 transmission to the subset that includes the strongest interferers. This information can be used by embodiments of user equipment 215 that implement an advanced cancellation receiver (e.g., a successive interference cancellation, or SIC, receiver). Some embodiments of an SIC receiver demodulate the entire signal, and hence, the strongest interferer would have a high chance (compared to that of a weak interferer) of being detected by user equipment 215.

Some embodiments of the user equipment 215 may decode the data channel(s) 235, and the mitigation logic 245 may perform interference subtraction only when a cyclic redundancy check (CRC) of an individual transmission on the data channel passes. In this case, the common control channel 240 may convey the same information as in other embodiments that support full decoding, except the common control channel 240 may not convey HARQ retransmission information (e.g. HARQ process ID), because user equipment 215 may not perform HARQ combining for the interfering data in this embodiment. The benefit of the interference cancellation in these embodiments may be dependent on the proportion of interfering data packets that could be decoded without HARQ retransmission.

Some embodiments of the user equipment 215 may suppress the interference caused by the data channel(s) 235 without decoding the data channel(s) 235. For example, the common control channel 240 may convey information identifying modulation and/or coding schemes (MCSs) used by the MCS logic 250 to modulate and encode the data channel 235. For another example, the common control channel 240 may convey information identifying the transmit-side precoders used by the precoder logic 255 to precode the interfering data signal(s) before transmission over the air interface. Knowledge of the transmit-side precoders used to transmit the interfering data signal(s) facilitates estimation of the covariance matrix of the interference in cases when precoded reference signals are not embedded in the interfering data signal(s). Some embodiments of the common control channel 240 may also convey information identifying a number of spatial layers used for transmission of the data channel, a number of codewords used for transmission of the data channel, or other information that may be used to suppress interference caused by the data channel. In some embodiments, the common control channel 240 may therefore convey the information needed for full decoding of the interfering data channel 235, but the user equipment 215 may only extract relevant information from each indicated dedicated control channel. Some embodiments of the common control channel 240 may convey all the information needed to perform the interference suppression; this has the advantage that user equipment 215 only has to perform a single decoding of the common control channel 240 and does not have to decode the dedicated control channels.

In embodiments that operate according to HSDPA, the common control channel 240 conveys information that indicates the modulation scheme used on each channelization code for the different HSDPA channels. The common control channel 240 may also optionally convey information indicating the number of transport blocks (in the case of multiple-in-multiple-out (MIMO) transmission) and/or the transmit-side precoder used (also in the case of MIMO transmission). For example, the common HS-SCCH 240 could carry the above information in blocks corresponding to each scheduled user equipment in the interfering cell 205. The number of bits transmitted over the common HS-SCCH 240 would depend on the number of scheduled user equipment. For example, if the CCS, MCS and precoding weight information (PWI) were to be provided for just one UE, 7+3+2=12 bits would be needed; for the upper limit of 15 UEs, 12×15=180 bits would be needed. For another example, the common HS-SCCH 240 may convey the above information code-by-code across the 15 available channelization codes for HS-DSCH data. In this case, the number of bits required on the common HS-SCCH 240 would be independent of the number of scheduled UEs and 3+2=5 bits would be needed per channelization code to indicate the MCS and MI, making a total of 5×15=75 bits. This approach may therefore be more efficient when 6 or more UEs are scheduled. Alternatively, if PWI is not signaled, this approach may be more efficient when 5 or more UEs are scheduled.

In embodiments that operate according to LTE, the common control channel 240 may convey some or all of the following information:
  modulation scheme (e.g. 3 bits)
  pilot scheme (DMRS or CRS) (e.g. 1 bit)
  transmission mode (e.g. 3 bits)
  antenna port configuration (e.g. 4 bits)
  precoding index (for CRS based pilot scheme)(e.g. 2-4 bits)
  Number of codewords (e.g. 1 bit)
  Number of spatial layers (e.g. 2 bits)
  precoding information (e.g. 3-6 bits)

The common control channel 240 may therefore use 15 or more bits per PRB some embodiments. For a system bandwidth with 100 PRB this approach would require transmitting 1500 bits or more, which could represent a large amount of overhead in some embodiments. Some embodiments of the interfering cell 205 may therefore select a subset of the PRBs and transmit the above information for the selected subset of PRBs. For example, the interfering cell 205 may use a measure of the strength of the interference caused by the PRBs to estimate interference at user equipment 215. The interfering cell may estimate the strength of the interference based on parameters such as a number of spreading codes used to transmit data to user equipment 215, a power level used to transmit data to user equipment 215, an amount of time-frequency resource used to transmit data to user equipment 215. This information may be indicated by a selected dedicated control channel. The interfering cell 205 may then use these measures to select a subset of the PRBs that are considered to be in some sense the strongest interferers. For example, a PRB may be considered a strong interferer due to having a high transmit power or comprising a large resource allocation.

Some embodiments of the common control channel 240 may include primary and secondary common control channels. For example, the common control channel 240 may include a primary common control channel that may convey an indication of one or more secondary common control channels within the same sub-frame. Implementations of these embodiments may be useful if the interfering cell 205 serves more than one user equipment over data channels 235 that are strong interferers at user equipment 215. For example, by having a primary common HS-SCCH, the user equipment 215 only needs to monitor for one common control channel 240. User equipment 215 may therefore only monitor a secondary common control channel if the primary common control channel indicates that one or more additional common control channel is present.

Some embodiments of the interfering cell 205 may broadcast multiple concurrent common HS-SCCHs 240, which would require the user equipment 215 to blind decode multiple possible common HS-SCCHs 240 and would increase the complexity of user equipment 215. In the case of HSDPA, the indication of one or more additional common HS-SCCHs could advantageously be located at the first slot of the HS-SCCH. This allows the user equipment 215 to receive other common HS-SCCHs 240 early which may allow the user equipment 215 to decode and cancel the HS-PDSCH transmitted from the interfering cell 205 because the HS-PDSCH starts at the second slot of the high-speed shared control channel (HS-SCCH).

Figure 3:
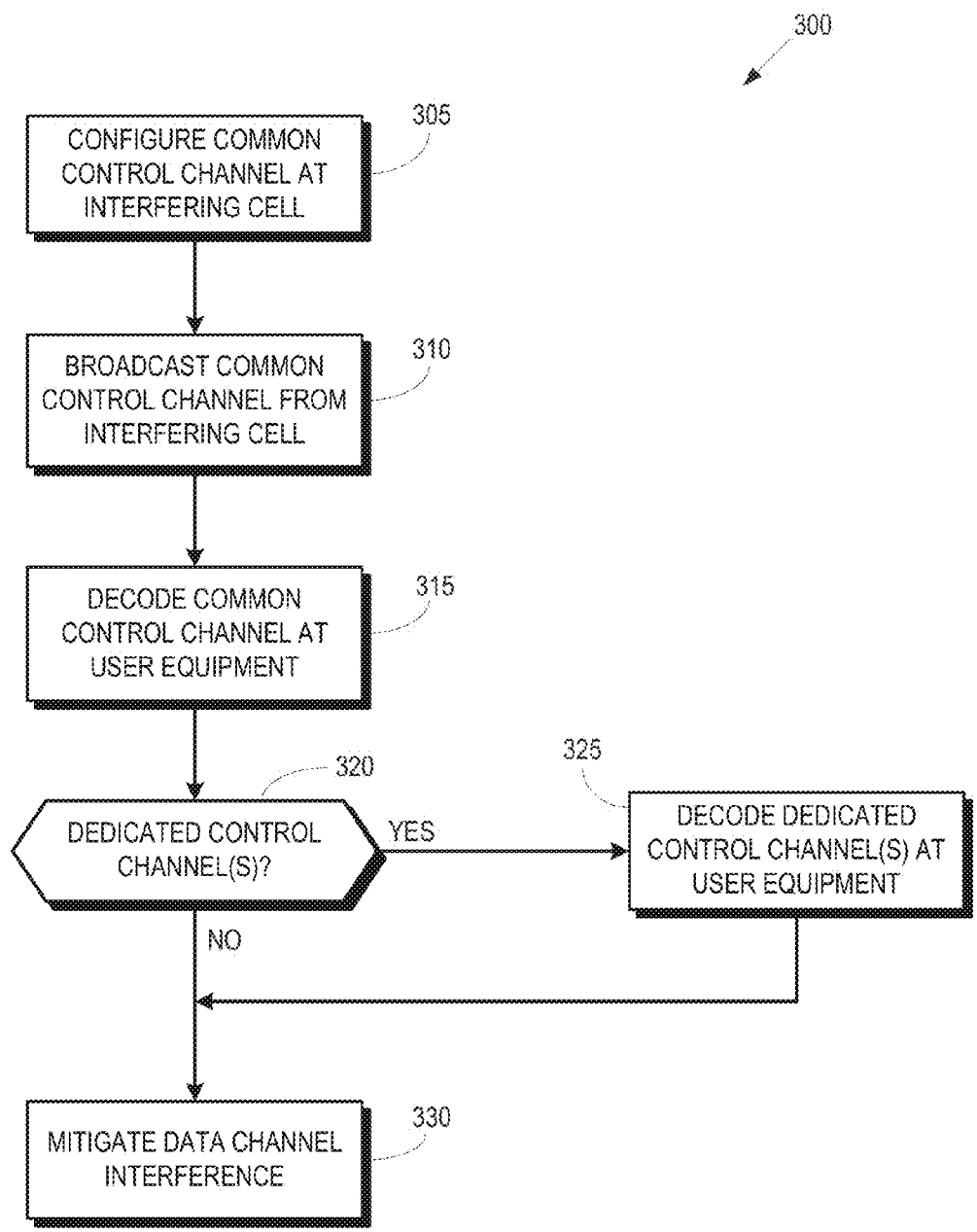

FIG. 3 is a flow diagram of a method 300 for mitigating interference using control information broadcast by an interfering cell, according to some embodiments. At block 305, an interfering cell, such as the interfering cell 205 shown in FIG. 2, can configure a common control channel thr broadcast over an air interface. Embodiments of the interfering cell may configure the common control channel based on information received from an interfered cell such as the interfered cell 210 shown in FIG. 2 that is serving one or more user equipment, such as user equipment 215 shown in FIG. 2. For example, the interfered cell may receive information indicating the interference mitigation capabilities of user equipment and may use this information to provide information that the interfering cell may use to appropriately configure the common control channel. The overhead of the common control channel can then be managed, e.g., by only transmitting the complete control channel information when user equipment served by the interfered cell are able to decode data channels and subtract the decoded information to mitigate the interference. The interfering cell may then broadcast the common control channel at block 310, e.g., in response to a request from the interfered cell.

At block 315, user equipment that receive the broadcast common control channel can decode the common control channel and extract information conveyed by the common control channel. For example, the user equipment can decode the common control channel and extract information used to decode data channel transmitted by the interfering cell so that the decoded data channel can be subtracted from signals received by the user equipment, as discussed herein. For another example, the user equipment can decode the common control channel and extract information that can be used to suppress interference caused by the data channel without decoding the data channel. Some embodiments of the common control channel may also include information that can be used to identify and/or decode control channels dedicated to user equipment served by the interfering cell. At block 320, the method 300 may determine whether the common control channel includes information identifying dedicated control channels. If so, the user equipment may decode the dedicated control channels using the information conveyed in the common control channel at block 325. If not, block 325 may be bypassed. At block 330, user equipment can mitigate data channel interference using the received information by suppressing or canceling/subtracting interference caused by data channels transmitted by the interfering cell.

Figure 4:
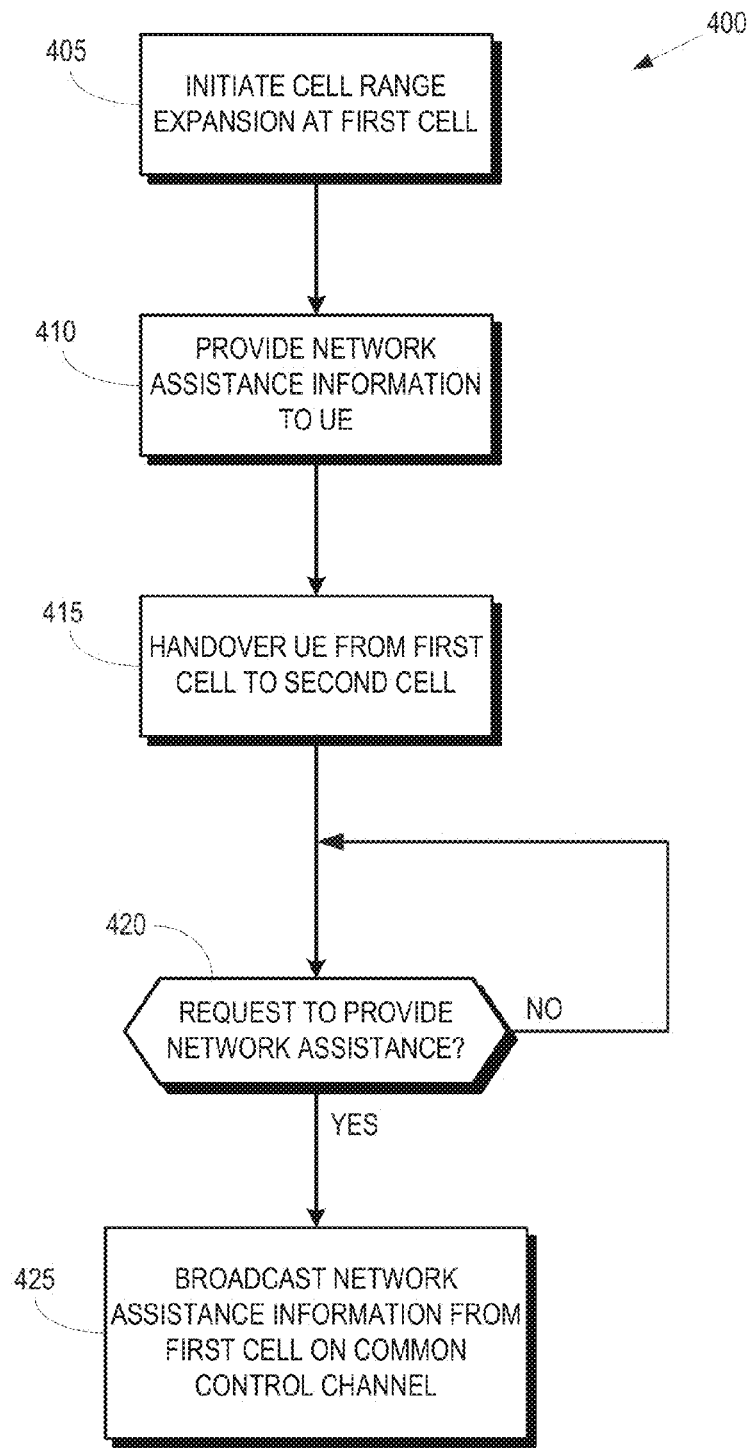

FIG. 4 is a flow diagram of a method 400 for providing network assistance information for interference mitigation, according to some embodiments. At block 405, a first cell may initiate cell range expansion by applying a bias to handovers of user equipment from the first cell to one or more second cells. For example, the first cell may be a macrocell and the second cells may be small cells deployed in an overlay configuration with the macrocell. The bias may be applied to preferentially offload user equipment from the macrocells to the small cells to improve overall system throughput. For example, a large Cell Range Expansion (CRE) offset value may be applied to bias the user equipment to hand off from a macrocell (the first cell) to a smaller cell (the second cells). At block 410, the first cell may provide network assistance information to the user equipment so that the user equipment can subsequently use the network assistance information to identify and decode a common control channel broadcast by the first cell. The CRE may be initiated by the first cell, which becomes an interfering cell after handover to the second (interfered) cell. The first cell may therefore signal the network assistance information to the user equipment prior to handover so that the user equipment is able to decode the common control channel.

User equipment may hand over from the first cell to the second cell at block 415. The user equipment may therefore be receiving significant interference from the first (interfering) cell. At decision block 420, the interfering cell determines whether it has received a request to provide network assistance for interference mitigation at the user equipment. If not, the interfering cell continues to wait fir a request. Once the interfering cell receives a request for network assistance, the interfering cell broadcasts network assistance information on the common control channel at block 425. Since network assistance may be requested for user equipment that are in the cell range expansion region, and therefore, face strong interference from the interfering cell, the user equipment may also be more likely to be able to decode a common HS-SCCH than user equipment that are closer to the second cell, e.g., within the normal cell range. In contrast, user equipment in the cell range expansion region may not be able to decode the common HS-SCCH from the second cell since the user equipment is in a negative geometry. Hence, user equipment that are likely to decode the first cell's common channel are also the ones that would benefit from interference cancellation.

Some embodiments of the second cell can request network assistance by providing a request Information Element (IE) to the first cell. For example, the IE may include a request to start transmitting a common control channel carrying information to assist interference cancellation/suppression. The second cell may decide to transmit the request based on the reported channel quality information (CQI) received from the user equipment. In the example of system that operates according to HSDPA, the user equipment only monitors for the first cell's common HS-SCCH if the user equipment's radio condition (e.g. SINR) is below a configured threshold. The second cell may therefore only provide a request to the first cell when the reported SINR is below the configured threshold. For LTE, the Cell ID reported to the second cell based on cell acquisition could be used by the second cell as an indication to request network assistance from cells (such as the first cell) that are most likely to be the strongest interferers. As discussed herein, in some embodiments the interfering cell may already be broadcasting the common control channel but the interfered user equipment may only monitor for this common control channel if its radio condition falls below a threshold. In this case, the user equipment may not inform the network when it begins monitoring the common control channel.

One embodiment of the uses a Load Indication procedure to request transfer of network assistance information by the receiving cell. Table 1 shown below shows a Request IE with further requested information or a single-bit Request for Network assistance information.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1...<maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0...<maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | Ignore |
| >>Network Assistance Information | O | | | | YES | |

Figure 5:
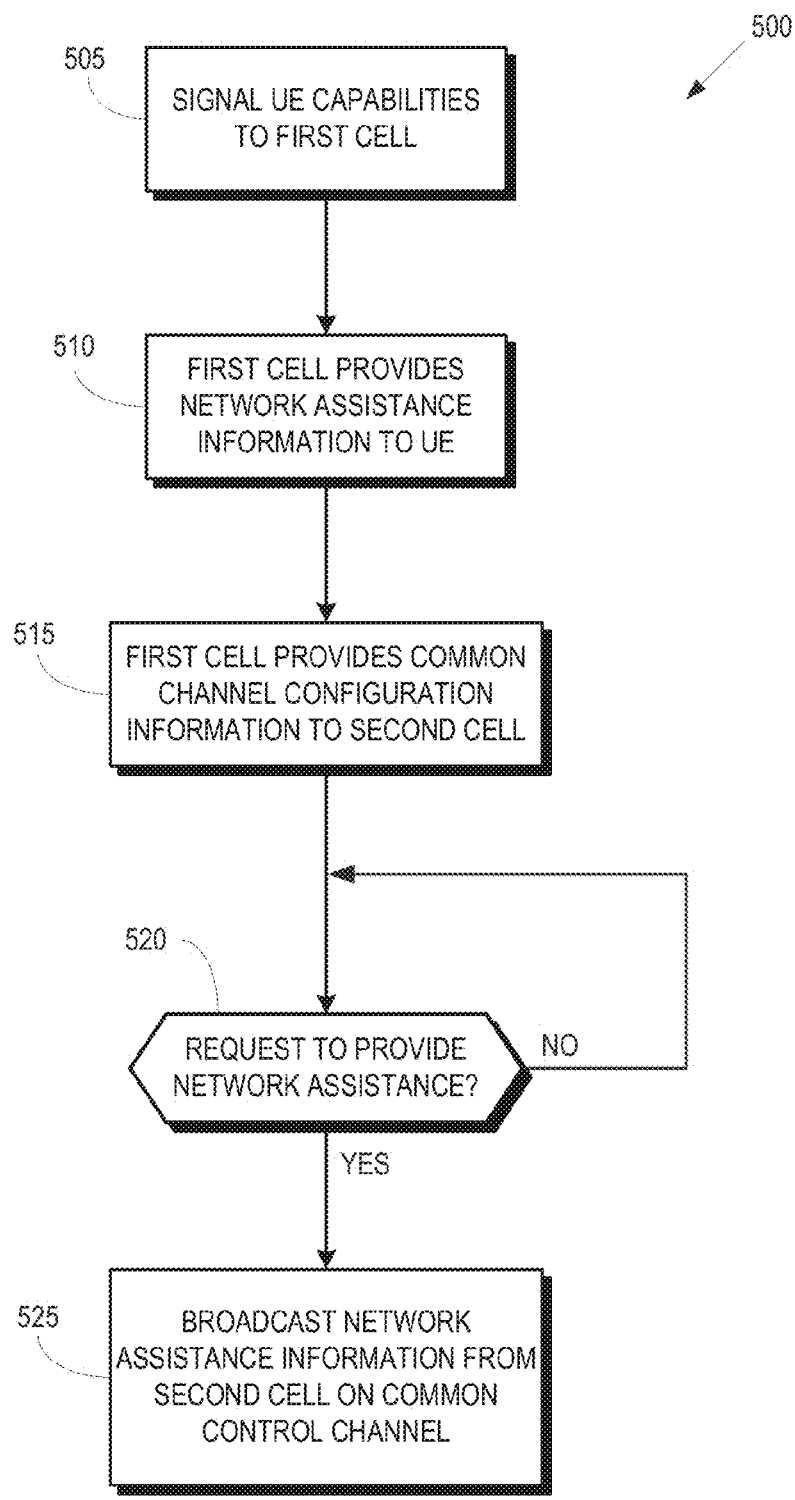

FIG. 5 is a flow diagram of a method 500 for providing network assistance information for interference mitigation, according to some embodiments. At block 505, user equipment signals its interference mitigation capabilities to its current (first) serving cell. For example, user equipment may indicate that it is able to decode data channels and subtract the decoded data channel information, or that is able to suppress the interfering data channel without decoding the data channel. At block 510, the first cell may provide network assistance information to the user equipment based on the received interference cancellation capability information. For example, an interfered serving cell may signal decoding information to enable the user equipment to decode a common control channel broadcast by an interfering cell. The common control channel may carry control information relevant to the interference mitigation capability of the user equipment. For example, in HSDPA, if the user equipment is capable of only interference suppression, the first cell may signal the OVSF code of the common control channel of the interfering cell.

The first cell may also provide common control channel configuration information to the second cell at block 515. The configuration information may be determined using the interference mitigation capability information transmitted to the first cell by the user equipment. For example, the second cell may configure a common control channel to convey information that allows the user equipment to decode the data channel transmitted by the second cell up to the symbol level, which is suitable for suppressing interference, thereby avoiding the overhead required to broadcast unnecessary information in the common control channel. The first cell may also tell the second cell what type of common control signal is required. For example, if the second cell only serves user equipment that are capable of interference suppression and are not capable of interference cancellation or subtraction, there is no need for the second cell to transmit common control channel containing information for interference cancellation.

At block 520, the second cell determines whether it has received a request to provide network assistance by broadcasting a common control channel. If not, the second cell waits for the request. Once the second cell receives a request to provide network assistance, the second cell may begin broadcasting network assistance information on the common control channel at block 525. In some embodiments, the network assistance information may be provided in response to the first (interfered) cell deciding whether to request the network assistance information, instead of having user equipment decide whether to request the network assistance information. The first cell may request dedicated or common network assistance information, and the second (interfering) cell may use this information to decide if network assistance information should be dedicated or broadcast. Some embodiments of the first cell may signal the PRBs where high interference is experienced, as discussed herein. This allows the second cell to identify user equipment that could be potential sources of interference and so that the second cell can send the appropriate assistance information to the user equipment. Some embodiments of the first cell may also be able to provide information identifying the user equipment capabilities to the second cell. For example, the first cell may indicate whether the user equipment implements minimum mean squared error estimation (MMSE), MMSE incremental redundancy combining (MMSE-IRC), or some other receiver type.

One embodiment of an IE that uses the Load Indication procedure to request transfer of network assistance information by the second cell is shown below in Table 2.

TABLE 2

| IE/Group Name | Presence | Range | IE type and reference | Semantics description |
|---|---|---|---|---|
| CHOICE Network Assistance Information | O | — | — | |
| >UE Receiver Capability | O | — | — | |
| >Common or dedicated Assistance. For Dedicated assistance information, the UE(s) ID | | | | |
| >PRB location where Network assistance is needed | | | | |

Mitigating interference using control information broadcast by an interfering cell has a number of advantages over the conventional practice of broadcasting the control information from an interfered cell. For example, embodiments of the techniques described herein may reduce the number of additional decodes or decoding delays experienced by user equipment. For another example, embodiments of the techniques described herein are not dependent on scheduling coordination between serving/interfered cell and interfering cells and do not require negligible latency in the interface between serving and interfering cells. No timing or scheduling coordination is required between the interfered cell and the interfering cell, since the interfering cell may send out the decoding information for the HS-PDSCH codes corresponding to data channels that the interfering cell estimates causes the most interference. Scheduling coordination is especially difficult when the interfered cell and the interfering cell are from different vendors or when the backhaul link between the interfered cell and the interfering cell is non-ideal, e.g. exhibits non-negligible latency. Embodiments of the techniques described herein are also efficient, e.g. they may incur low additional signaling overhead. The parameters of the common control channel itself, e.g., in the case of HSDPA, its scrambling code, common RNTI ID, can be configured by the interfering cell or the interfered cell using radio resource control (RRC) layer signaling.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an Optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
broadcasting control information from a first cell over a common control channel, wherein the control information is associated with a data channel transmitted by the first cell and the control information is usable by user equipment served by a second cell to mitigate interference caused by the data channel at the user equipment, wherein broadcasting the control information comprises broadcasting control information indicating at least one of an identity of user equipment served by the first cell, a spreading code used to transmit a dedicated control channel toward user equipment served by the first cell, an indication of time or frequency resources used to transmit a dedicated control channel, or demodulation information for a subset of physical resource blocks allocated to user equipment served by the first cell.

2. The method of claim 1, wherein broadcasting the control information from the first cell comprises broadcasting the control information from the first cell in response to receiving a request from the second cell.

3. The method of claim 2, further comprising:
providing information usable by the user equipment to decode the common control channel in response to a handover of the user equipment to the second cell.

4. The method of claim 2, wherein receiving the request from the second cell comprises receiving configuration information usable to configure the common control channel that is broadcast from the first cell.

5. The method of claim 1, further comprising selecting at least one of the dedicated control channel or the subset of the physical resource blocks based on an estimate of interference to the user equipment, wherein the estimate is performed by the first cell.

6. The method of claim 5, wherein the estimate of interference comprises at least one of a number of spreading codes used to transmit data to user equipment served by the first cell, a power level used to transmit data to user equipment served by the first cell, or an amount of time-frequency resource used to transmit data to user equipment served by the first cell, wherein the data is indicated by the selected dedicated control channel.

7. A method comprising:
broadcasting control information from a first cell over a common control channel, wherein the control information is associated with a data channel transmitted by the first cell and the control information is usable by user equipment served by a second cell to mitigate interference caused by the data channel at the user equipment, wherein broadcasting the control information comprises broadcasting control information indicating at least one of a modulation scheme used for transmission of the data channel, a coding scheme used for transmission of the data channel, a number of spatial layers used for transmission of the data channel, a number of codewords used for transmission of the data channel, or a precoding matrix used to precode information transmitted over the data channel.

8. A method comprising:
decoding, at user equipment, control information received from a first cell over a common control channel, wherein the user equipment is served by a second cell;
using the control information to mitigate interference at the user equipment caused by a data channel received from the first cell;
decoding the data channel using the control information received from the first cell; and
mitigating the interference at the user equipment by subtracting the decoded data channel from signals received at the user equipment, wherein decoding the data channel comprises decoding the data channel using control information indicating at least one of an identity of user equipment served by the first cell, a spreading code used to transmit a dedicated control channel toward user equipment served by the first cell, an indication of time or frequency resources used transmit the dedicated control channel, or demodulation information for a subset of physical resource blocks allocated to user equipment served by the first cell.

9. The method of claim 8, further comprising:
receiving, at the user equipment, information usable to decode the common control channel in response to a handover of the user equipment to the second cell.

10. The method of claim 8, wherein the subset of the physical resource blocks is selected by the first cell based on an estimate of interference at the user equipment, wherein the estimate is performed by the first cell.

11. The method of claim 8, wherein mitigating the interference at the user equipment comprises subtracting the decoded data channel from signals received at the user equipment in response to a correct cyclic redundancy check of at least one transmission on the data channel.

12. The method of claim 8, comprising mitigating the interference by suppressing interference caused by the data channel based on the control information without decoding the data channel.

13. The method of claim 8, comprising decoding at least one additional common control channel and mitigating interference caused by at least one other data channel transmitted by the first cell using control information from said at least one decoded additional control channel.

14. The method of claim 8, comprising monitoring the common control channel in response to a channel condition at the user equipment falling below a threshold.

15. A method comprising:
decoding, at user equipment, control information received from a first cell over a common control channel, wherein the user equipment is served by a second cell;
using the control information to mitigate interface at the user equipment caused by a data channel received from the first cell; and
mitigating the interference by suppressing interference caused by the data channel based on the control information without decoding the data channel, wherein mitigating the interference comprises mitigating the interference using control information indicating at least one of a modulation scheme used for transmission of the data channel, a coding scheme used for transmission of the data channel, a number of spatial layers used for transmission of the data channel, a number of codewords used for transmission of the data channel, or a precoding matrix used to precode information transmitted over the data channel.

16. A device to provide wireless connectivity and to serve a first cell, comprising:
at least one processor configured to:
broadcast control information over a common control channel, wherein the control information is associated with a data channel transmitted by the device and the control information is usable by user equipment served by a second cell to mitigate interference caused by the data channel at the user equipment, wherein broadcasting the control information comprises broadcasting control information indicating at least one of an identity of user equipment served by the device, a spreading code used to transmit a dedicated control channel toward user equipment served by the device, an indication of time or frequency resources used to transmit a dedicated control channel, or demodulation information for a subset of physical resource blocks allocated to user equipment served by the device.

17. A device to provide wireless connectivity and to serve a first cell, comprising:
at least one processor configured to:
broadcast control information over a common control channel, wherein the control information is associated with a data channel transmitted by the device and the control information is usable by user equipment served by a second cell to mitigate interference caused by the data channel at the user equipment, wherein broadcasting the control information comprises broadcasting control information indicating at least one of a modulation scheme used for transmission of the data channel, a coding scheme used for transmission of the data channel, a number of spatial layers used for transmission of the data channel, a number of codewords used for transmission of the data channel, or a precoding matrix used to precode information transmitted over the data channel.

18. User equipment comprising:
at least one processor configured to:
decode control information received from a first cell over a common control channel, wherein the user equipment is served by a second cell;
use the control information to mitigate interference at the user equipment caused by a data channel received from the first cell;
decode the data channel using the control information received from the first cell; and
mitigate the interference at the user equipment by subtracting the decoded data channel from signals received at the user equipment, wherein decoding the data channel comprises decoding the data channel using control information indicating at least one of an identity of user equipment served by the first cell, a spreading code used to transmit a dedicated control channel toward user equipment served by the first cell, an indication of time or frequency resources used transmit the dedicated control channel, or demodulation information for a subset of physical resource blocks allocated to user equipment served by the first cell.

19. User equipment comprising:
at least one processor configured to:
decode control information received from a first cell over a common control channel, wherein the user equipment is served by a second cell;
use the control information to mitigate interference at the user equipment caused by a data channel received from the first cell; and
mitigate the interference by suppressing interference caused by the data channel based on the control information without decoding the data channel, wherein mitigating the interference comprises mitigating the interference using control information indicating at least one of a modulation scheme used for transmission of the data channel, a coding scheme used for transmission of the data channel, a number of spatial layers used for transmission of the data channel, a number of codewords used for transmission of the data channel, or a precoding matrix used to precode information transmitted over the data channel.

* * * * *